United States Patent
Mehandjiysky et al.

(10) Patent No.: US 9,874,900 B2
(45) Date of Patent: Jan. 23, 2018

(54) FORM ADJUSTABLE ANGLE BETWEEN A BATTERY AND BATTERY CAVITY TO SELECTIVELY PLACE A VIDEO DISPLAY IN VIEWING ORIENTATIONS

(71) Applicant: HEWLETT-PACKARD DEVELOPMENT COMPANY, L.P., Houston, TX (US)

(72) Inventors: Dimitre Mehandjiysky, Houston, TX (US); Michael Delpier, Houston, TX (US); Insun Hong, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/023,608

(22) PCT Filed: Nov. 1, 2013

(86) PCT No.: PCT/US2013/067949
§ 371 (c)(1),
(2) Date: Mar. 21, 2016

(87) PCT Pub. No.: WO2015/065467
PCT Pub. Date: May 7, 2015

(65) Prior Publication Data
US 2016/0239048 A1    Aug. 18, 2016

(51) Int. Cl.
*G06F 1/16*    (2006.01)

(52) U.S. Cl.
CPC ............ *G06F 1/1626* (2013.01); *G06F 1/166* (2013.01); *G06F 1/1633* (2013.01); *G06F 1/1635* (2013.01); *G06F 2200/1614* (2013.01)

(58) Field of Classification Search
CPC .............................. G06F 1/1626; G06F 1/166
See application file for complete search history.

(56) References Cited

U.S. PATENT DOCUMENTS

| | | | |
|---|---|---|---|
| 7,167,358 | B2 | 1/2007 | Iwasaki et al. |
| 7,502,222 | B2 | 3/2009 | Cheng et al. |
| 2004/0191614 | A1 | 9/2004 | Iwasaki et al. |
| 2006/0221565 | A1 | 10/2006 | Doherty et al. |
| 2008/0068786 | A1 | 3/2008 | Cheng et al. |
| 2008/0108395 | A1 | 5/2008 | Lee et al. |

(Continued)

FOREIGN PATENT DOCUMENTS

| | | |
|---|---|---|
| CN | 2410679 | 12/2000 |
| KR | 20130045521 | 5/2013 |

(Continued)

*Primary Examiner* — David Bilodeau
(74) *Attorney, Agent, or Firm* — HP Inc. Patent Department

(57) ABSTRACT

A tablet computing device may include a main body, a video display, and a battery cavity. The main body may include a front side and a back side. The video display may be disposed on the front side. The video display may display images. The battery cavity is disposed on the back side to receive a battery to supply power to the main body. The battery may form an adjustable angle between the battery and the battery cavity. The video display may be selectively placed in one of a plurality of viewing orientations based on an amount of the adjustable angle.

12 Claims, 9 Drawing Sheets

(56) References Cited

U.S. PATENT DOCUMENTS

| | | | |
|---|---|---|---|
| 2008/0253066 A1* | 10/2008 | Tracy | F16M 11/10 |
| | | | 361/601 |
| 2009/0244832 A1* | 10/2009 | Behar | G06F 1/162 |
| | | | 361/679.55 |
| 2012/0257350 A1 | 10/2012 | Chen et al. | |
| 2013/0002049 A1 | 1/2013 | Stampfli | |
| 2013/0109253 A1* | 5/2013 | Gammon | F16M 11/10 |
| | | | 439/883 |

FOREIGN PATENT DOCUMENTS

| | | |
|---|---|---|
| TW | M243863 | 9/2004 |
| TW | I238931 | 9/2005 |
| TW | M391815 | 11/2010 |
| TW | M425307 | 3/2012 |
| TW | 201308044 A | 2/2013 |

\* cited by examiner

S510

ROTATING A REMOVABLE BATTERY COUPLED TO A HINGE MEMBER CONNECTED TO A FIRST CAVITY END OF A BATTERY CAVITY OF A MAIN BODY OF A TABLET COMPUTING SYSTEM ABOUT THE FIRST CAVITY END IN A FIRST DIRECTION AND AWAY FROM THE BATTERY CAVITY TO FORM AN ADJUSTABLE ANGLE THERE BETWEEN SUCH THAT THE FIRST CAVITY END CORRESPONDS TO AN OUTER END OF THE MAIN BODY

S512

SELECTIVELY PLACING THE VIDEO DISPLAY IN ONE OF A PLURALITY OF VIEWING ORIENTATIONS TO VIEW THE VIDEO DISPLAY BASED ON AN AMOUNT OF THE ADJUSTABLE ANGLE

*FIG. 5*

FORM ADJUSTABLE ANGLE BETWEEN A BATTERY AND BATTERY CAVITY TO SELECTIVELY PLACE A VIDEO DISPLAY IN VIEWING ORIENTATIONS

BACKGROUND

Tablet computing devices having video displays may be portable and used in a variety of locations. Users may want to change a viewing orientation of the video display. Accessary devices such as display stands, tablet covers, and the like, may be used to provide different viewing orientations to view the video displays.

BRIEF DESCRIPTION OF THE DRAWINGS

No limiting examples are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

FIG. 5 is a flowchart illustrating a method of selecting viewing orientation of a video display of a tablet computing system according to an example.

DETAILED DESCRIPTION

Tablet computing systems having video displays may be portable and used in a variety of locations. Tablet computing systems may include smartphone devices having video displays, tablet computers having video displays, and the like. Users may want to select different viewing orientations of the video display based on use preferences, tablet locations, and the content being viewed. Accessary devices such as display stands, tablet covers, and the like, may be used to provide viewing orientations to view the video display. However, at times, accessary devices may be inconvenient with which to travel, lost, increase the cost of the tablet computing system experience, and offer few viewing orientations to view the video display of the tablet computing system.

In examples, a tablet computing system includes a main body having a front side and a back side, a video display disposed on the front side, and a battery cavity disposed on the back side to receive a battery to supply power to the main body. The video display may display images. The battery cavity may include a first cavity end to correspond to an outer end of the main body. The tablet computing system may also include a hinge member having a first hinge end coupled to the first cavity end and a second hinge end to removably receive a first battery end of the battery. The hinge member may cause the battery to rotate about the first cavity end to form an adjustable angle between the battery and the battery cavity. The video display may be selectively placed in one of a plurality of viewing orientations to view it based on an amount of the adjustable angle. Thus, the battery may function as a torqued hinge stand so that a user may select from the plurality of viewing orientations to view the video display without an accessory by rotating the battery away from and towards the battery cavity. Accordingly, travel inconveniences, lost accessories, and an increased cost of the tablet computing system user experience may be reduced.

Figure 1:
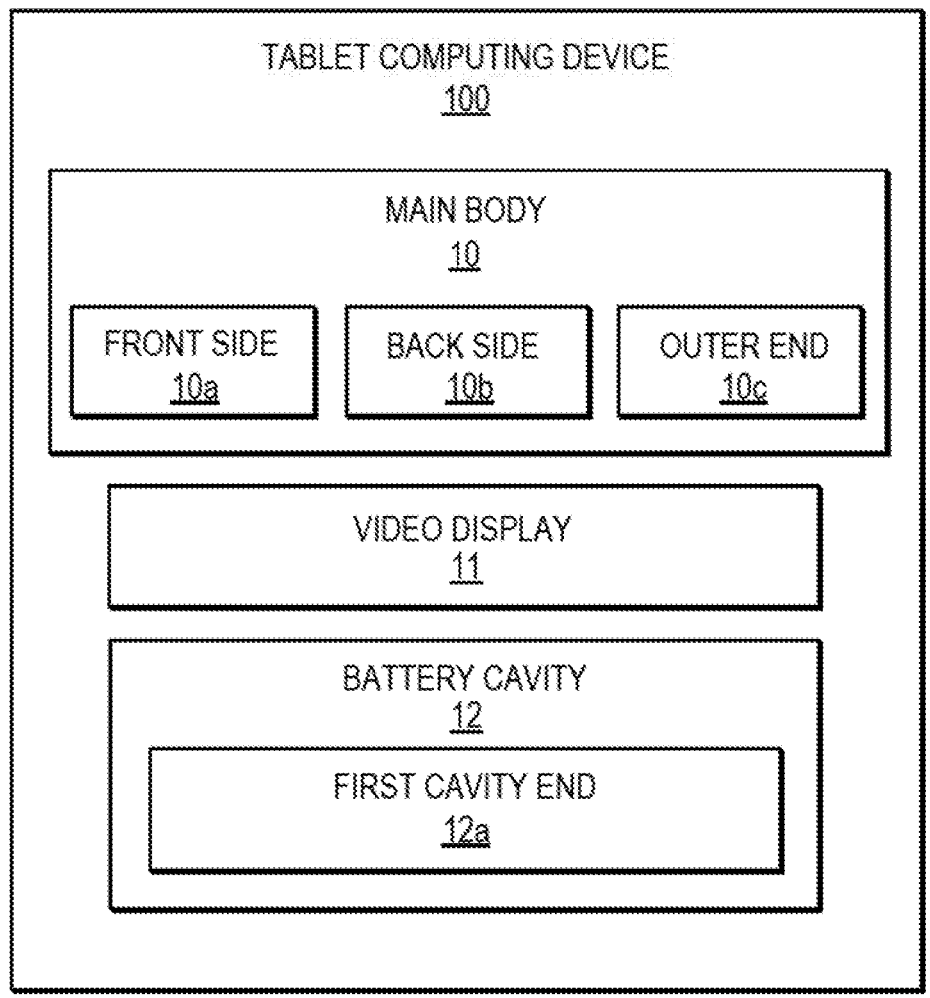
FIG. 1 is a block diagram illustrating a tablet competing device according to an example.

FIG. 1 is a block diagram illustrating a tablet computing device according to an example. Referring to FIG. 1, in some examples, a tablet computing device 100 includes a main body 10, a video display 11, and a battery cavity 12. The main body 10 includes a front side 10a, a back side 10b, and an outer end 10c. The video display 11 is disposed on the front side 10a. The video display 11 may display images. Images may include text, symbols, graphics, and the like.

Referring to FIG. 1 in some examples, the battery cavity 12 is disposed on the back side 10b to receive a removable battery to supply power to the main body 10. The battery cavity 12 includes a first cavity end 12a to correspond to the outer end 10c of the main body 10 to removably receive a first battery end of the battery. The outer end 10c, for example, may be an outer edge of a housing of the main body 10 of the tablet computing device 100. For example, the battery cavity 12 may include a recessed area on the back side 10b of the main body 10 for the battery to be placed into the recessed area in a retracted state and out of the recessed area in an extended state. The first cavity end 12a may cause the battery to rotate thereabout in an extended state to form an adjustable angle α between the battery and the battery cavity 12. The video display 11 is selectively placed in one of a plurality of viewing orientations to view the video display 11 based on an amount of the adjustable angle α.

Figure 2A:
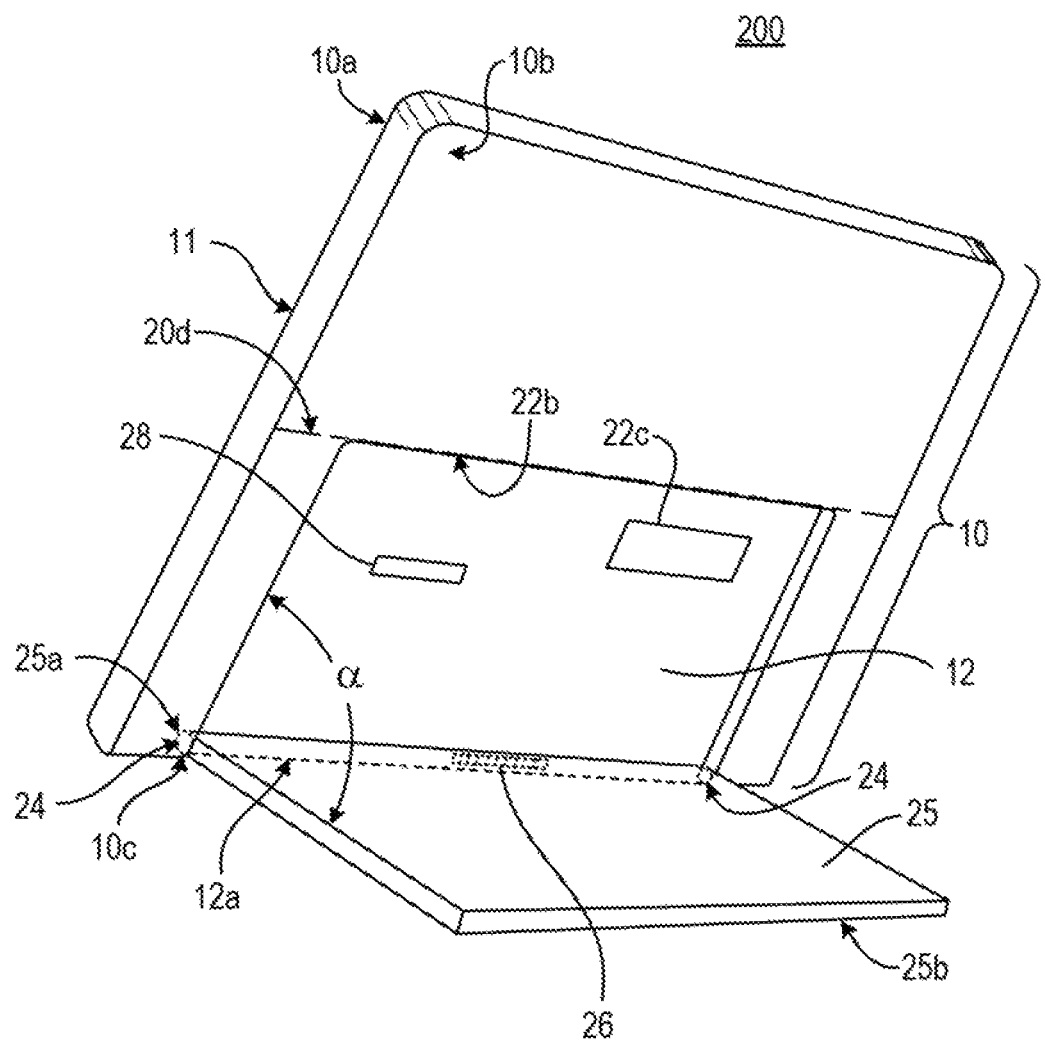
FIG. 2A is a perspective view illustrating a tablet computing device having a battery in an extended state according to an example.
Figure 2B:
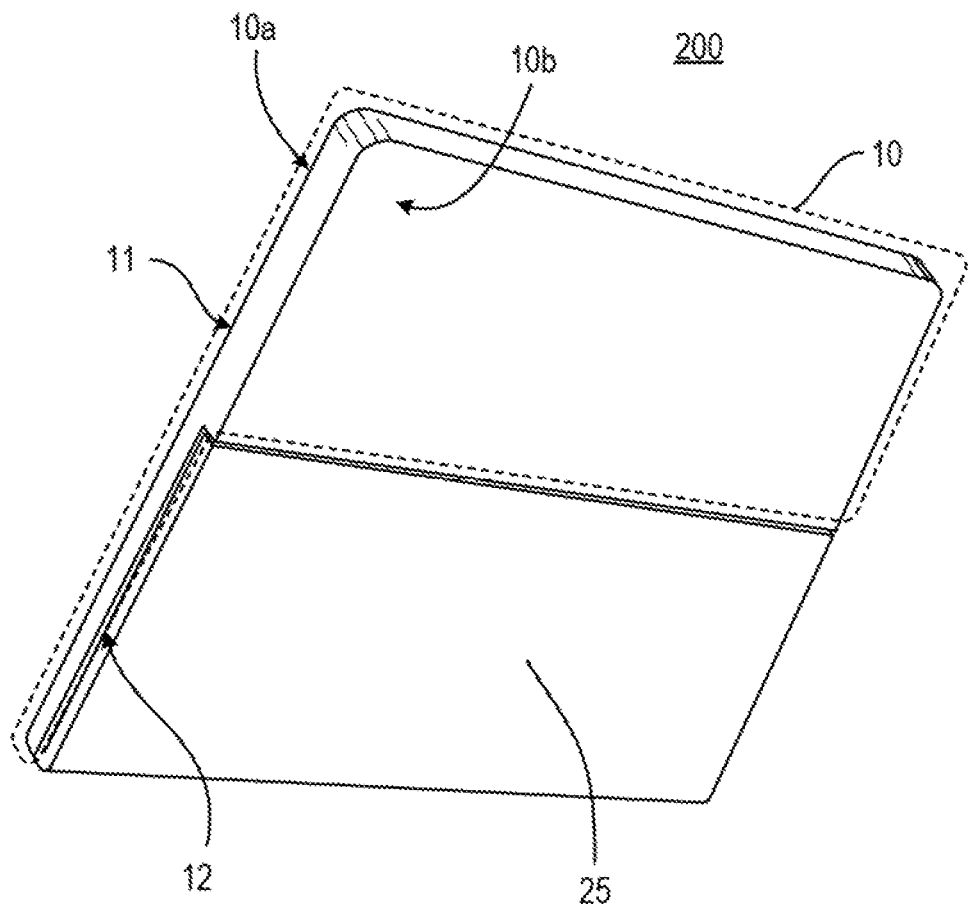
FIG. 2B is a perspective view illustrating the tablet computing device of FIG. 2A having a battery in a retracted state according to an example.
Figure 2C:
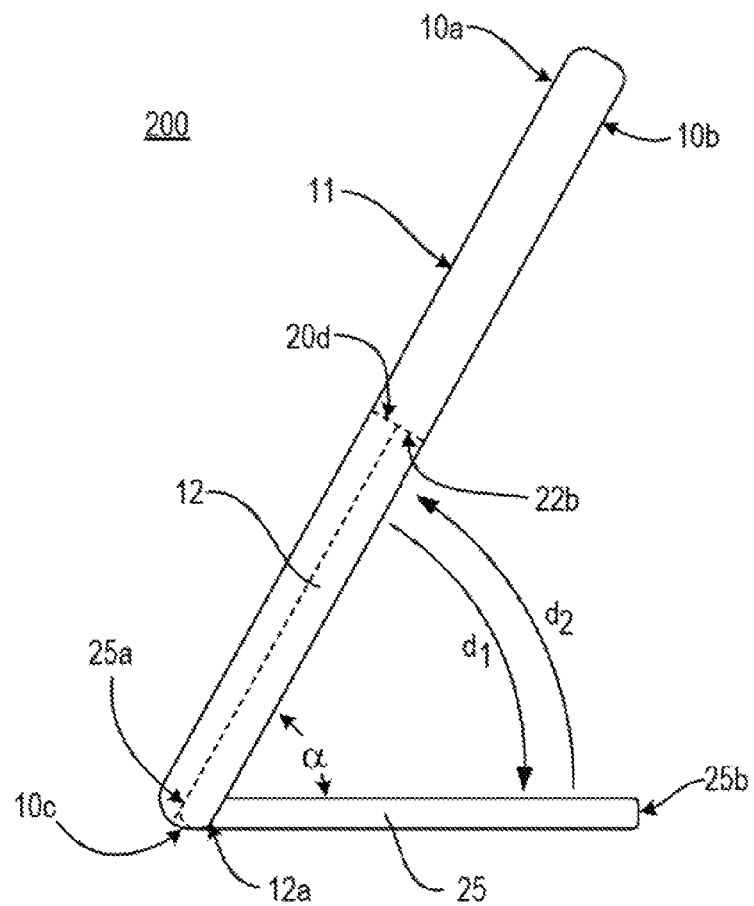
FIG. 2C is a side view illustrating the tablet computing device of FIG. 2A in an upright stand mode according to an example.
Figure 2D:
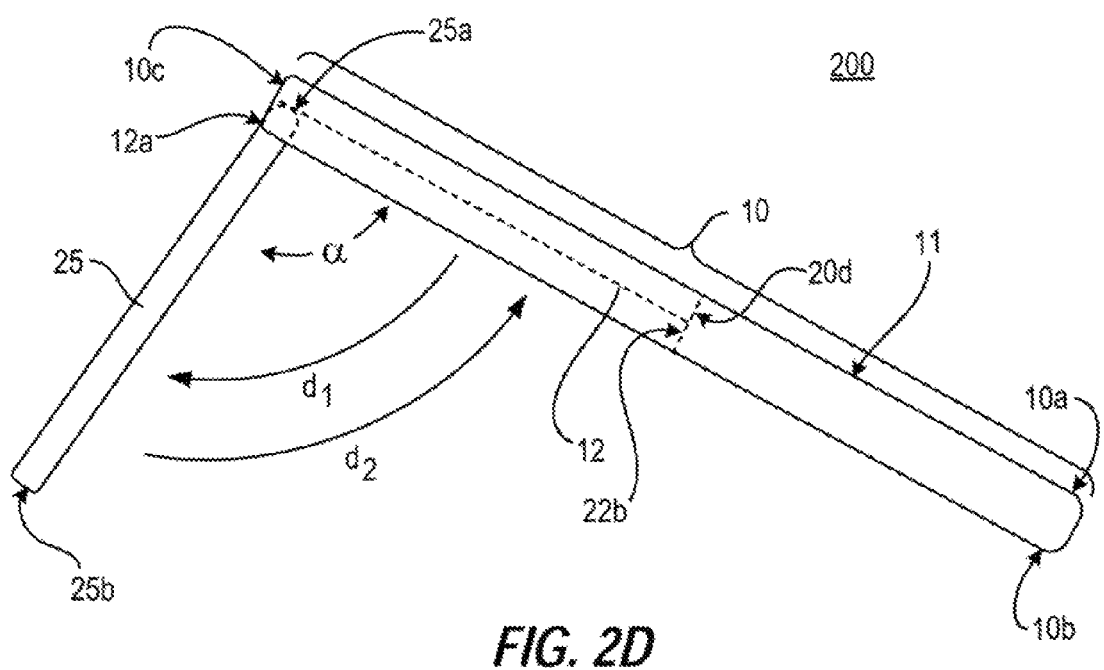
FIG. 2D is a side view illustrating the tablet computing device of FIG. 2A in an inclined stand mode according to an example.

FIG. 2A is a perspective view illustrating a tablet computing device having a battery in an extended state according to an example. FIG. 2B is a perspective view illustrating the tablet computing device of FIG. 2A having a battery in a retracted state according to an example. FIG. 2C is a side view illustrating the tablet computing device of FIG. 2A in an upright stand mode according to an example. FIG. 2D is a side view illustrating the tablet computing device of FIG. 2A in an inclined stand mode according to an example. In some examples, a tablet computing device 200 may include the main body 10, the video display 11 and the battery cavity 12 as previously described with respect to the tablet computing device 100 of FIG. 1. The battery cavity 12 may also include a second cavity end 22b, a main body electrical connector 26, a memory port 28, and an information surface 22c. The second cavity end 22b may be disposed across from the first cavity end 12a to correspond to an intermediate portion 20d of the main body 10. For example, the intermediate portion 20d may be a back-side portion of the mid-section of the main body 10.

Referring to FIGS. 2A-2D, in some examples, the main body electrical connector 26 may electrically connect to the battery 25 to transfer a power signal between the main body 10 and the battery 25. For example, the main body electrical connector 26 may include electrical contacts, pogo pins, and the like. The memory port 28 may receive a memory device such as an SD-card, a mini SD, and a SIM card. Data from the memory device may be communicated to the main body 10 from the memory port 28. The information surface 22c may receive at least one label thereon. The label, for example, may include global regional standards information which may be viewed when the battery 25 is placed in the extended state from the battery cavity 12, and concealed when the battery 25 placed in the retracted state into the battery cavity 12. In some examples, the first cavity end 12a of the battery cavity 12 may include a pair of cavity connectors 24 to removably receive the first battery end 25a.

Referring to FIGS. 2A-2D, in some examples, the tablet computing device 200 may also include a battery 25. The battery 25 may include a first battery end 25a and a second battery end 25b. The first battery end 25a may connect to the first cavity end 12a. The second battery end 25b may simultaneously move away from the intermediate portion 20d and the battery cavity 12 in response to the second battery end 25b rotating in a first direction $d_1$. Additionally, the second battery end 25b may simultaneously move toward the intermediate portion 20d and the battery cavity 12 in response to the second battery end 25b rotating in a second direction $d_2$.

Referring to FIGS. 2A-2D, in some examples, the rotation of the battery 25 towards and away from the battery cavity 12 may change an amount of the adjustable angle $\alpha$ there between. For example, the different degrees of the adjustable angle $\alpha$ may change an amount of inclination of the video display 11 with respect to a user's view of it. Thus, the video display 11 may be placed in different viewing orientations for the user to view the video display 11. Further, the different degrees of the adjustable angle $\alpha$ may enable a user to move the tablet computing device 200 to place different portions thereof in contact with a support surface such as a table, and the like, to provide a variety of viewing orientations to view the video display 11. For example, the tablet computing device 200 may be placed in an upright stand mode having the adjusted angle $\alpha$ less than ninety degrees as illustrated in FIG. 2C. For example, the tablet computing device 200 may be placed in an inclined stand mode having the adjusted angle $\alpha$ greater than ninety degrees as illustrated in FIG. 2D.

Figure 3:
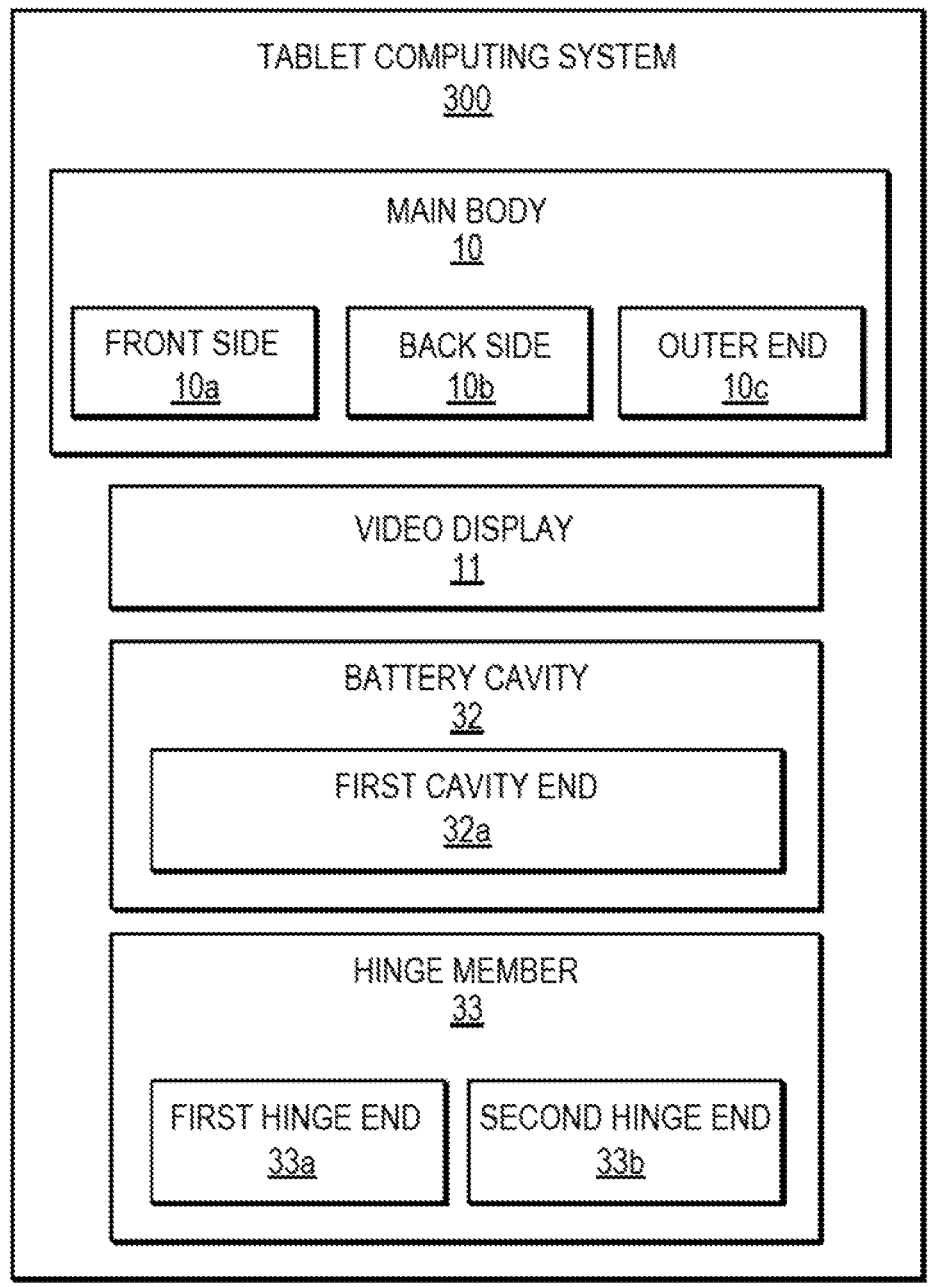
FIG. 3 is a block diagram illustrating a tablet computing system according to an example.

FIG. 3 is a block diagram illustrating a tablet computing system according to an example. Referring to FIG. 3, in some examples, a tablet computing system 300 includes a main body 10, a video display 11, a battery cavity 32, and a hinge member 33. The main body 10 includes a front side 10a, a back side 10b, and an outer end 10c. The video display 11 is disposed on the fret side 10a. The video display 11 may display images. The battery cavity 32 is disposed on the back side 10b to receive a battery to supply power to the main body 10.

Referring to FIG. 3, in some examples, the battery cavity 32 includes a first cavity end 32a to correspond to the outer end 10c of the main body 10. The outer end 10c, for example, may be an outer edge of a housing of the main body 10 of the tablet computing system 300. The hinge member 33 includes a first hinge end 33a coupled to the first cavity end 32a and a second hinge end 33b to removably receive a first battery end of the battery. The hinge member 33 may cause the battery to rotate about the first cavity end 32a to form an adjustable angle between the battery and the battery cavity 32. The video display 11 is selectively placed in one of a plurality of viewing orientations to view the video display 11 based on an amount of the adjustable angle.

Figure 4A:
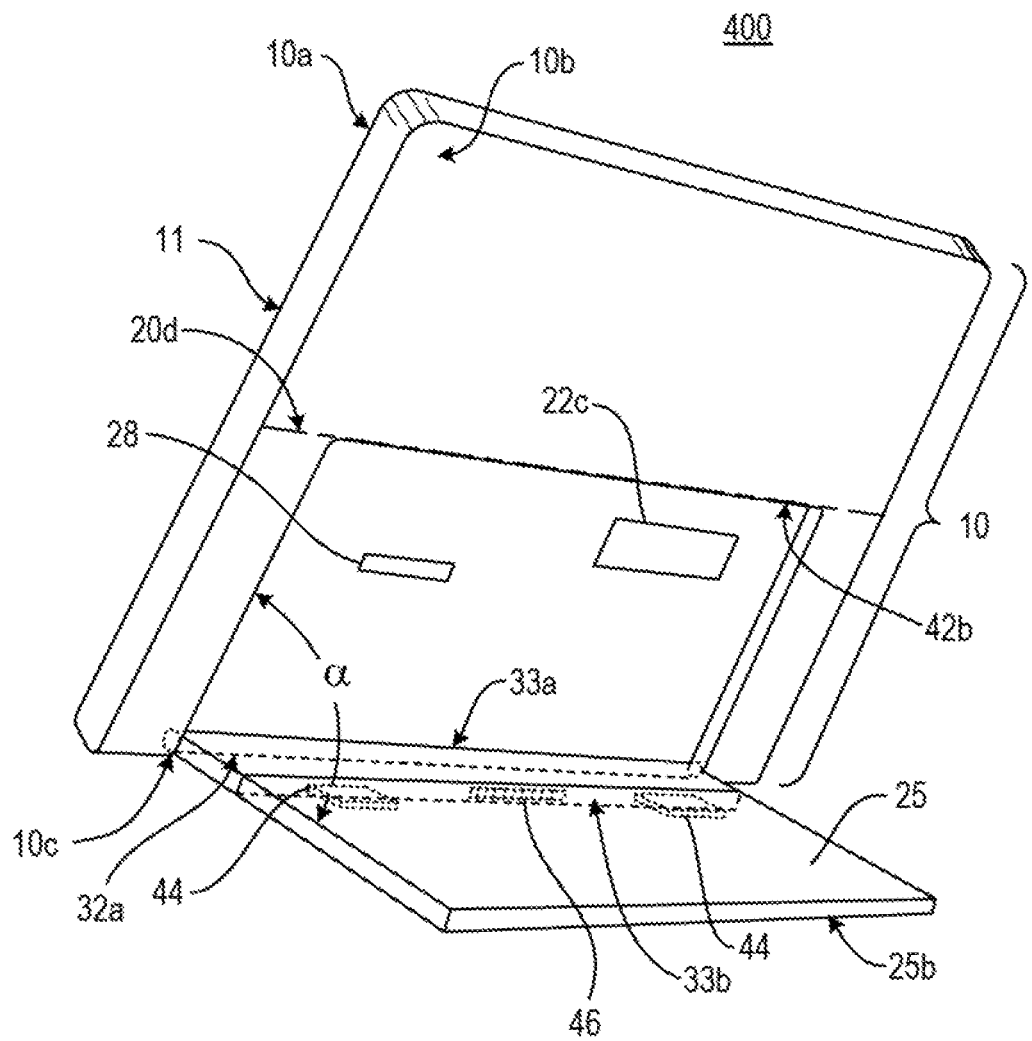
FIG. 4A is a perspective view illustrating tablet computing system having a battery in an extended state according to an example.
Figure 4B:
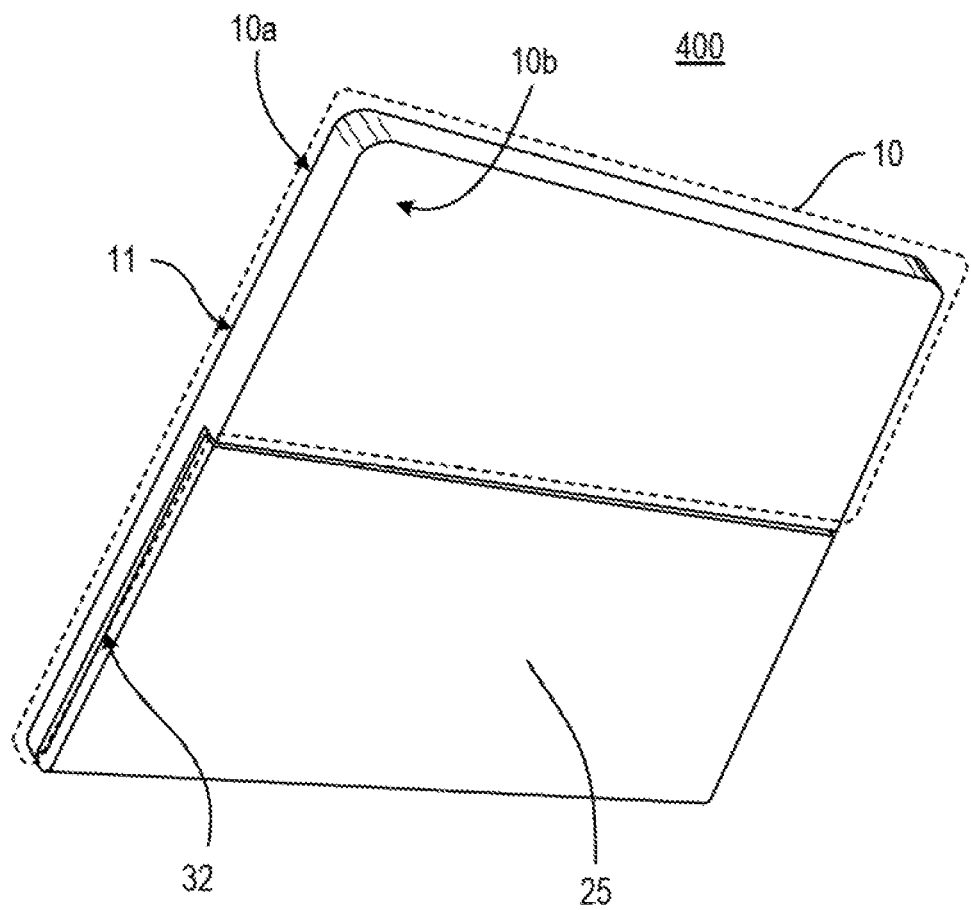
FIG. 4B is a perspective view illustrating the tablet computing system of FIG. 4A having a battery in a retracted state according to an example.
Figure 4C:
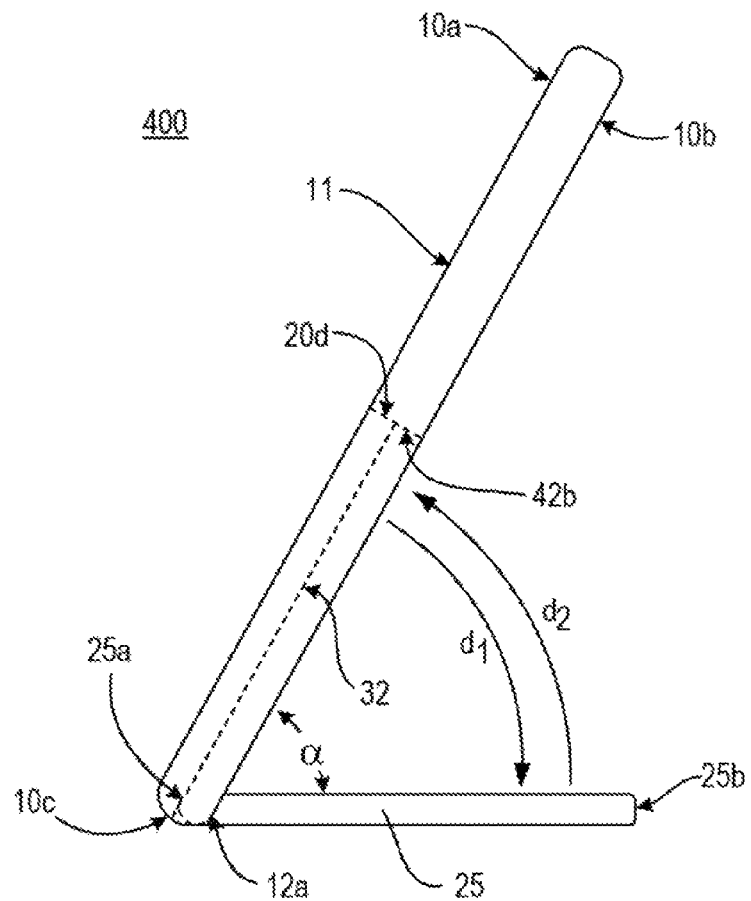
FIG. 4C is a side view illustrating the tablet computing system of FIG. 4A in an upright stand mode according to an example.
Figure 4D:
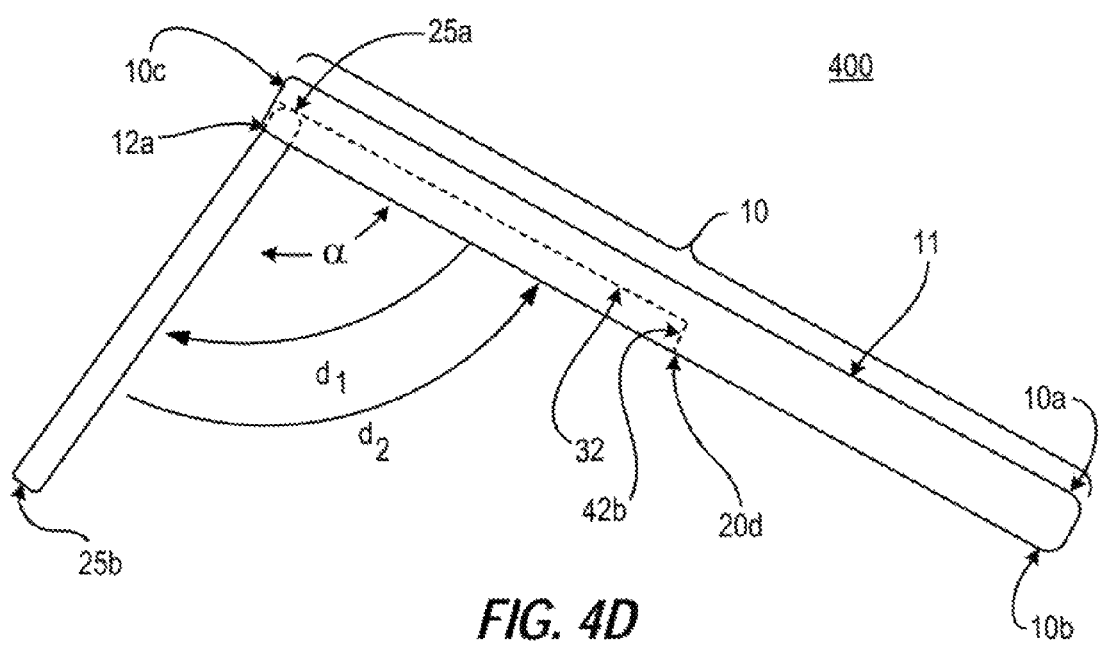
FIG. 4D is a side view illustrating the tablet computing system of FIG. 4A in an inclined stand mode according to an example.

FIG. 4A is a perspective view illustrating a tablet computing system having a battery in an extended state according to an example. FIG. 4B is a perspective view illustrating the tablet computing system of FIG. 4A having a battery in a retracted state according to an example. FIG. 4C is a side view illustrating the tablet computing system of FIG. 4A in an upright stand mode according to an example. FIG. 4D is a side view illustrating the tablet computing system of FIG. 4A in an inclined stand mode according to an example. Referring to FIGS. 4A-4D, in some examples, the tablet computing system 400 may include the main body 10, the video display 11, the battery cavity 32, and the hinge member 33 as previously described with respect to the tablet computing system 300 of FIG. 3. The tablet computing system 400 may also include a removable battery 25. The battery 25 may include a first battery end 25a and a second battery end 25b.

Referring to FIGS. 4A-4D, some examples, the battery cavity 32 may also include a second cavity end 42b, a memory port 28, and an information surface 22c. The second cavity end 42b may be disposed across from the first cavity end 32a to correspond to an intermediate portion 20d of the main body 10. For example, the intermediate portion 20d may be a back-side portion of the mid-section of the main body 10. The memory port 28 may receive a memory device such as an SD-card, a mini SD, and a SIM card. Data from the memory device may be communicated to the main body 10 from the memory port 28. The information surface 22c may receive at least one label thereon. The label, for example, may include global regional standards information which may be viewed when the battery 25 is placed in the extended state from the battery cavity 32, and concealed when the battery 25 is placed in the retracted state into the battery cavity 32.

Referring to FIGS. 4A-4D, in some examples, the hinge member 33 includes the first hinge end 33a coupled to the first cavity end 32a and a second hinge end 33b to removably receive the first battery end 25a of the battery 25. The second hinge end 33b of the hinge member 33 may include a hinge electrical connector 46 to electrically connect to the battery 25 to provide a power signal to the main body 10. For example, the hinge electrical connector 46 may include electrical contacts, pogo pins, and the like. In some examples, the second hinge end 33b of the hinge member 33 may also include a plurality of battery attachment members 44 to removably attach to the battery 25. For example, the plurality of battery attachment members 44 may include at least one of a hook and a magnet to removably engage the first battery end 25a of the battery 25. In some examples, the second battery end 25b may move away from the battery cavity 32 in response to the battery 25 rotating in a first direction $d_1$. The second battery end 25b may also move toward the battery cavity 32 in response to the battery 25 rotating in a second direction $d_2$.

Referring to FIGS. 4A-4D, in some examples, the rotation of the battery 25 towards and away from the battery cavity 32 may change an amount of the adjustable angle $\alpha$ there between. For example, the different degrees of the adjustable angle $\alpha$ may change an amount of inclination of the video display 11 with respect to a users view of it. Thus, the video display 11 may be placed in different viewing orientations for the user to view the video display 11. Further, the different degrees of the adjustable angle α may enable a user to move the tablet computing system 400 to place different portions thereof in contact with a support surface such as a table, and the like, to provide a variety of viewing orientations to view the video display 11.

FIG. 5 is a flowchart illustrating a method of selecting a viewing orientation of a video display of a tablet computing system according to an example. In some examples, the modules and/or assemblies implementing the method may be those described in relation to the tablet computing systems 300 and 400 of FIGS. 3-4D. In block S510, a removable battery coupled to a hinge member connected to a first cavity end of a battery cavity of a main body of the tablet computing system is rotated about the first cavity end in a first direction and away from the battery cavity to form an adjustable angle there between such that the first cavity end corresponds to an outer end of the main body.

In block S512, the video display is selectively placed in one of a plurality of viewing orientations to view the video display based on an amount of the adjustable angle. In some examples, the method may also include rotating the removable battery coupled to the hinge member connected to the first cavity end of the battery cavity of the main body of the tablet computing system about the first cavity end in a second direction and toward the battery cavity to form the adjustable angle.

It is to be understood that the flowchart of FIG. 6 illustrates architecture, functionality, and/or operation of examples of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowchart a FIG. 5 illustrates a specific order of execution, the order of execution may differ from that is depicted. For example, the order of execution of two or more blocks may be rearranged relative to the order illustrated. Also, two or more blocks illustrated in succession in FIG. 5 may be executed concurrently or with partial concurrence. All such variations are within the scope of the present disclosure.

The present disclosure has been described using non-limiting detailed descriptions of examples thereof that are not intended to limit the scope of the general inventive concept. It should be understood that features and/or operations described with respect to one example may be used with other examples and that not all examples have all of the features and or operations illustrated in a particular figure or described with respect to one of the examples. Variations of examples described will occur to persons of the art. Furthermore, the terms "comprise," "include," "have" and their conjugates, shall mean, when used in the disclosure and/or claims, "including but not necessarily limited to."

It is noted that some of the above described examples may include structure, acts or details of structures and acts that may not be essential to the general inventive concept and which are described for illustrative purposes. Structure and acts described herein are, replaceable by equivalents, which perform the same function, even if the structure or acts are different, as known in the art. Therefore, the scope of the general inventive concept is limited only by the elements and limitations as used in the claims.

What is claimed is:

1. A tablet computing device, comprising:
    a main body having a front side, a back side, and an outer end to correspond to an outer edge of a housing of the main body;
    a video display disposed on the front side, the video display to display images;
    a battery cavity disposed on the back side to removably receive a battery to supply power to the main body, wherein the battery is in a retracted state when received in the battery cavity, the battery cavity comprising:
        a memory port to receive a memory device, wherein the memory port is concealed by the battery when the battery is in the retracted state;
        a first cavity end to correspond to the outer end of the main body and to receive a first battery end of the battery; and
        a second cavity end disposed across from the first cavity end to correspond to an intermediate portion of the main body, the first cavity end to cause the battery to rotate thereabout to form an adjustable angle between the battery and the battery cavity; and
    wherein the video display is selectively placed in one of a plurality of viewing orientations to view the video display based on an amount of the adjustable angle.

2. The tablet computing device of claim 1, wherein the battery comprises:
    a second battery end configured to simultaneously move away from the intermediate portion and the battery cavity in response to the second battery end rotating in a first direction.

3. The tablet computing device of claim 2, wherein the second battery end is configured to simultaneously move toward the intermediate portion and the battery cavity in response to the second battery end rotating in a second direction.

4. The tablet computing device of claim 1, wherein the first cavity end comprises:
    a pair of cavity connectors to removably receive the first battery end.

5. The tablet computing device of claim 1, wherein the battery cavity further comprises:
    a main body electrical connector to electrically connect to the battery to transfer a power signal between the main body and the battery.

6. The tablet computing device of claim 1, wherein the first cavity ends comprises cavity connectors to removably receive the first battery end of the battery.

7. The tablet computing device of claim 6, wherein the first battery end of the battery is to be placed into a recessed area of the battery cavity when to be coupled to the cavity connectors.

8. A tablet computing system, comprising:
    a main body having a front side, a back side, and an outer end to correspond to an outer edge of a housing of the main body;
    a video display disposed on the front side, the video display to display images;
    a battery cavity disposed on the back side to receive a battery to supply power to the main body, wherein the battery is in a retracted state when received in the battery cavity, the battery cavity comprising:
        a memory port to receive a memory device, wherein the memory port is concealed by the battery when the battery is in the retracted state;
        a first cavity end to correspond to the outer end of the main body; and a second cavity end disposed across from the first cavity end to correspond to an intermediate portion of the main body;

a hinge member having a first hinge end coupled to the first cavity end and a second hinge end to removably receive a first battery end of the battery, the hinge member to cause the battery to rotate about the first cavity end to form an adjustable angle between the battery and the battery cavity; and wherein the video display is selectively placed in one of a plurality of viewing orientations to view the video display based on an amount of the adjustable angle.

9. The tablet computing system of claim 8, wherein the second hinge end of the hinge member comprises:

a hinge electrical connector to electrically connect to the battery to provide a power signal to the main body.

10. The tablet computing system of claim 9, wherein the second hinge end of the hinge member further comprises:

a plurality of battery attachment members to removably attach to the battery.

11. The tablet computing system of claim 10, wherein the plurality of battery attachment members comprise:

at least one of a hook and a magnet.

12. The tablet computing system of claim 9, wherein the battery is configured to move away from the battery cavity in response to the battery rotating in a first direction, and to move toward the battery cavity in response to the battery rotating in a second direction.

* * * * *